Jan. 1, 1963     A. W. NEDERHOOD     3,071,108
AIR FILTER FOR MILKING MACHINE PULSATOR
Filed Oct. 12, 1959
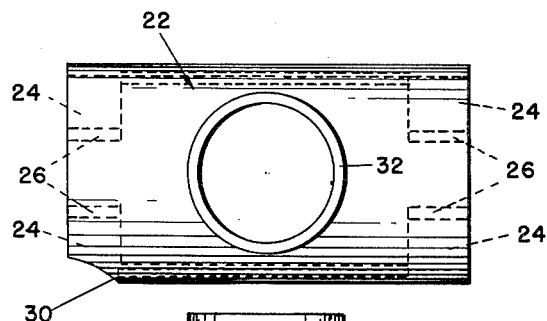
FIG-4
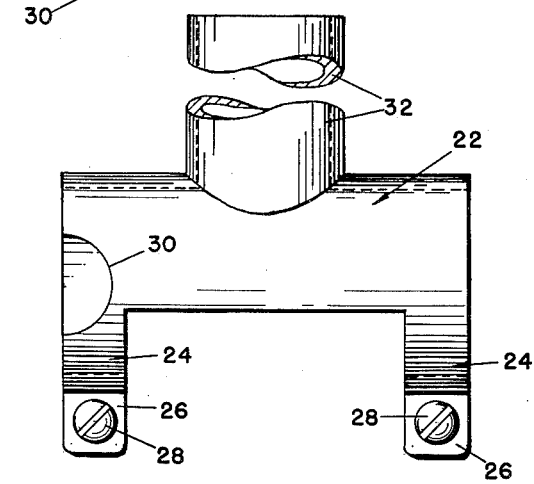
FIG-3
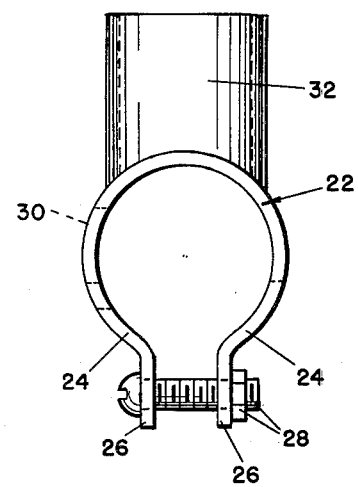
FIG-5
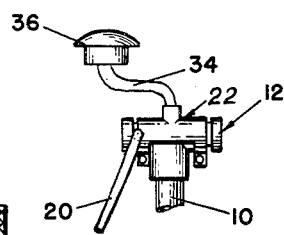
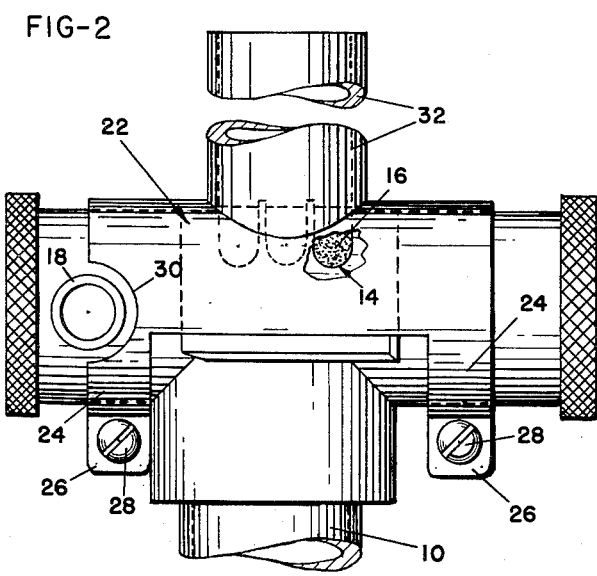
FIG-2     FIG-1
ALBERT W. NEDERHOOD
INVENTOR.

3,071,108
AIR FILTER FOR MILKING MACHINE PULSATOR
Albert W. Nederhood, Rte. 1, Colville, Wash.
Filed Oct. 12, 1959, Ser. No. 845,693
3 Claims. (Cl. 119—14.36)

This invention relates to a milking machine system and particularly to the pulsator of the type which operates to apply suction and atmospheric pressure alternately to the teat cups of a milking machine. More specifically the invention relates to a clog-proof air cleaner for cleaning the atmospheric air prior to its entry into the pulsator.

Heretofore it has been the customary practice to milk cows by machines operated from a vacuum line wherein a pulsator operated to apply the vacuum and atmospheric pressure alternately and intermittently at a milking machine to transmit the varying pressures to the teat cups applied to the individual cow. In this system a pulsator, of the type well known among those skilled in the particular art, is provided with an air ingress opening which may or may not contain a porous air filter. The purpose of the pulsator being to alternately permit the evacuation of a conduit of a vacuum milking system and then through the air ingress opening admit atmospheric pressure in continuous sequence.

When the pulsator having a porous filter is new and the porous filter is clean, the system works very effectively. However, it is well known that a considerable amount of microscopic dust is suspended in even the cleanest atmospheric air in barns and milking parlors and in most instances the condition of the atmospheric air is not as clean as would normally be desired. In these instances, when the pulsator admits atmospheric air through the porous filter, this suspended dust is deposited on the filter during the inflow of the atmospheric air and in due time the filter becomes partially clogged, thus the ingress of atmospheric air is hindered whereupon the vacuum created in the vacuum line is not fully released. This then interferes with the milking function of the milking machine. I learned that the moisture in the air would also aggravate this situation in the partial closing of the porous filter.

Pulsators not having the porous filter may be employed but without the filter dust collects in the working parts of the pulsator and hinders its operation to an extent that it renders the pulsator progressively ineffective in a similar manner.

By experimentation I learned that a pulsator will operate continuously over a long period of time without maintenance when clear air is supplied to the ingress opening thereof. It then became apparent that a clog-proof air filter for supplying clean air to the pulsator would overcome the aforesaid deficiencies.

It is therefore a principal object of this invention to provide in combination, with a pulsator designed to alternately evacuate a conduit of a vacuum milking system and then admit atmospheric pressure in continuous sequence, a clog-proof filter.

The structure solving the aforesaid problem is herein described in reference to the accompanying drawings in which FIGURE 1 is a diagrammatic view of a pulsator of a milking system and having a clog-proof air filter associated therewith;

FIGURE 2 is an enlarged elevational view of the pulsator and an impervious jacket associated therewith having portions broken away for convenience of illustration;

FIGURE 3 is a side elevation of the impervious jacket; and

FIGURES 4, and 5 are respectively a top plan view and an end elevation of the impervious jacket.

Having reference now in more detail to the drawings, I disclose in FIGURE 1 a vacuum line 10 which broadly indicates a well known milking system such as that disclosed in U.S. Patent No. 2,809,607, for example. The vacuum line couples to the pulsator 12 in the normal manner and the pulsator is provided with an air ingress opening 14 here seen to be in three sections, within which is disposed a porous air filter 16 in such relative manner as to filter the air passing into the pulsator through the air ingress opening 14.

The pulsator is also provided with a tubular port 18 to which a tube 20 of a smaller diameter than the vacuum line 10 is interconnected with the pulsator 12. The pulsator is connected with the vacuum line 10 in such manner that it will operate in the usual manner to set up an alternate degree of vacuum in the tube 20 and atmospheric pressure to function in the well known manner as indicated by the aforesaid patent.

The pulsator 12 is provided with an impervious adaptor jacket 22 which generally is semi-cylindrical in configuration and has integral clamping bands 24 terminating in ears 26 bored to receive cooperating clamping bolts and nuts 28. The adaptor jacket is relieved at 30 by a semi-circular depression to provide clearance about the tubular port 18.

Midway its length an medially of its arc, the adaptor jacket 22 is provided with a hollow tube 32 which opens interiorly of the adaptor jacket 22 and is disposed in registry with the air ingress opening 14 of the pulsator, thus communicating atmospheric air with the pulsator through the tube 32.

It will be understood that the adaptor jacket 22, by means of the clamping bands 24, is hermetically sealed with the body of the pulsator 12 so that air entering the ingress opening 14 must pass through the hollow tube 32.

A conduit 34 communicates the hollow tube 32 with a clog-proof air filter 36 which may be one of many well known structures. I prefer, however, to employ a fluid bath type air filter for the reason that it will remove and contain a vast quantity of air suspended dust and thus materially reduce the maintenance frequency.

Prior to this invention I found it necessary to remove the porous filter 16 and clean and oil the pulsator as frequently as every 30 to 45 minutes whereas with the present invention the pulsator will operate very efficiently for periods of a month or more depending on the atmospheric conditions.

Therefore it is to be seen that I have produced an exceedingly simple but most effective device for the purpose intended and while I have shown and described the device in one particular form, it is obvious that structural changes may be employed without departing from the spirit of the invention and I therefore do not desire to be limited to that precise structure disclosed beyond the limitations which may be imposed by the following claims:

I claim:

1. For use in an air filtering system for the pulsator of a milking machine and including a fluid bath air filter, means for supplying clean air from said filter to the air ingress opening of said pulsator, comprising: a removable adaptor jacket of impervious material having substantially a semi-cylindrical arcuate configuration; means for releasably securing the jacket to a pulsator; a hollow tube opening interiorily of the jacket intermediate its length and medially of its semi-cylindrical arc for registry with an air ingress opening of a pulsator; and said hollow tube having means to connect to a conduit through which air may flow from said fluid bath filter.

2. In a milking system including a pulsator of the character described having an atmospheric air ingress opening with a porous air filter therein; an impervious adaptor jacket hermetically secured to said pulsator, and having a hollow tube communicating with said opening; a fluid bath oil filter for delivering clean air and a conduit interconnecting said fluid bath filter, and said tube for supplying air from the atmosphere cleaned by said fluid bath filter to said porous filter.

3. For use in an air filtering system for the pulsator of a milking machine and including a fluid bath air filter, means for supplying clean air from said filter to the air ingress opening of said pulsator, comprising: a removable adaptor jacket of impervious material; means for releasably securing the jacket to a pulsator; a hollow tube opening interiorly of the jacket for registry with an air ingress opening of a pulsator; and said hollow tube having means to connect to a conduit through which air may flow from said fluid bath filter.

References Cited in the file of this patent

UNITED STATES PATENTS

| | | |
|---|---|---|
| 951,403 | Lane | Mar. 8, 1910 |
| 1,195,995 | Leitch | Aug. 20, 1916 |
| 2,414,904 | Sebok | Jan. 28, 1947 |
| 2,514,543 | Hamman | July 11, 1950 |
| 2,655,168 | Henrard | Oct. 13, 1953 |
| 2,665,702 | Rawson | Jan. 12, 1954 |
| 2,675,821 | Conde | Apr. 20, 1954 |
| 2,696,193 | Domingo | Dec. 7, 1954 |
| 2,808,025 | Graves | Oct. 1, 1957 |